Sept. 8, 1936.  H. E. SPADE  2,053,641

STEAM TRAP

Filed Aug. 20, 1932

Inventor
Henry E. Spade
by Townsend F. Beaman
Attorney

Patented Sept. 8, 1936

2,053,641

UNITED STATES PATENT OFFICE 2,053,641

STEAM TRAP

Henry E. Spade, Jackson, Mich.

Application August 20, 1932, Serial No. 629,607

12 Claims. (Cl. 137—103)

The present invention relates to improvements in float actuated valve mechanism for steam traps and the like particularly pertains to the so called inverted open bucket type originally disclosed in the patent to Arner, granted October 17, 1911, bearing No. 1,006,043.

The main objects of this invention are: First, to provide a steam trap or the like in which the valve is opened by a direct downward pull. Second, to provide a valve opening mechanism in which the entire weight of the valve actuating mechanism as well as that of the valve and its stem, is utilized in removing the valve from its seat and out of the apex of the flow of fluid through the valve opening. Third, to provide a steam trap or the like having a leverage capable of exerting an increasing force upon the valve after the valve has been "cracked" and is being removed from the seat. Fourth, to provide a valve actuating mechanism which is capable of imparting a partial rotation to the valve each opening of the valve to effect a self seating valve and avoid scouring, cutting and clogging. Fifth, to provide a steam trap in which the wear, at the point of fulcrumage of the valve opening leverage, is uniformly distributed. Sixth, to provide a steam trap of the aforesaid type in which the valve is closed at bucket speed. Seventh, to provide a steam trap of the aforesaid type in which an auxiliary vent, under the control of the valve opening mechanism, is provided to effect a rapid opening of the valve to full open position.

These and other objects and advantages will manifest themselves as the description proceeds. It is to be strictly understood, however, that I do not desire to be limited to the exact details shown or described, but that I intend to include as part of my invention all such changes and modifications of parts as would occur to those skilled in this art and would fall within the scope of the appended claims.

In the accompanying drawing wherein a preferred embodiment of my invention is shown, Fig. 1 is a side elevation of the valve seating mechanism with the split housing and associated member shown in cross section.

Figure 1:
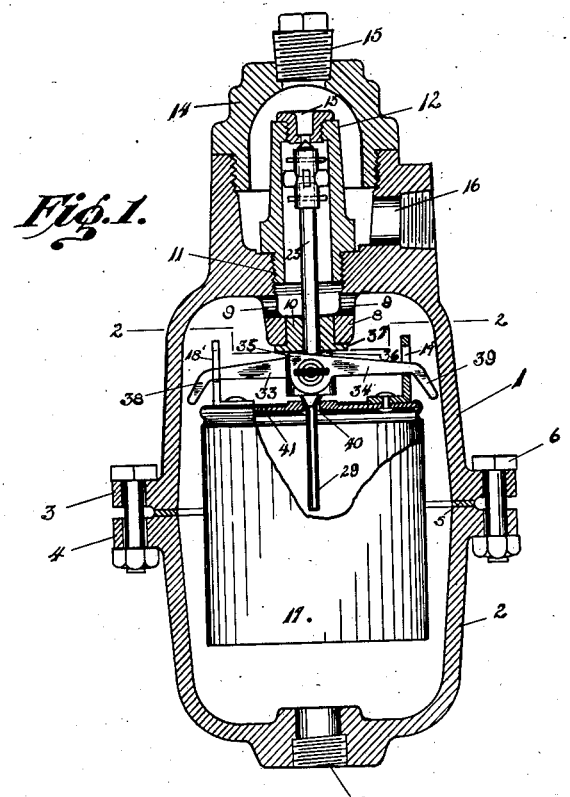
Figure 2:
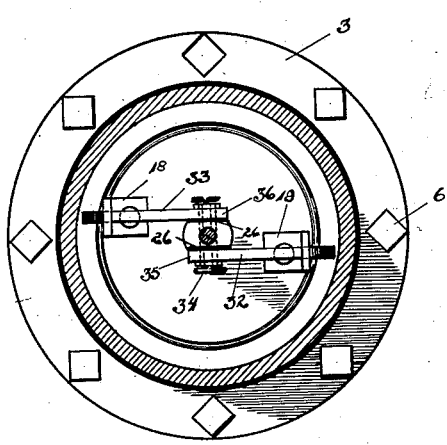
Fig. 2 is a cross sectional view taken on line 2—2 of Fig. 1.

Referring to the drawing, my improved steam trap consists of a float chamber defined by upper and lower cast body portions designated 1—2, respectively, having flange portions 3—4. A gasket 5 is preferably inserted between the flange 3—4 and the body portions may be removably secured together as a unit by bolts 6. An inlet port 7 in the body portion 2, is internally threaded to receive standard fittings leading from the point in the steam system at which condensation accumulates. Upper body portion 1 is provided with a boss 8 having discharge ports 9 and is adapted to receive a bushing and guide member 10. Concentric with the boss 8 is a threaded aperture 11 into which a valve cage 12 is threadedly secured. The upper portion of the cage 12 is threaded and receives a replaceable valve seat 13 having a ported interior.

A cap is screwed to the upper portion of the body 1 and it has a threaded plug 15 closing as optional outlet. In order to provide a horizontal discharge, the body 1 is provided with an outlet 16, threaded to receive standard fittings. If desired, the outlet 16 may be plugged and the plug 15 removed to provide a vertical discharge.

The valve actuating mechanism for opening and closing the ported valve seat 13, consists of a governor member in the form of an inverted open bucket 17. The bucket 17 may be of any suitable construction and is provided with L-shaped brackets 18—19 having openings 18'—19' in the vertical portions. As illustrated, the brackets are riveted to the top of the bucket 17 and are slightly offset relative to each other.

Figure 3:
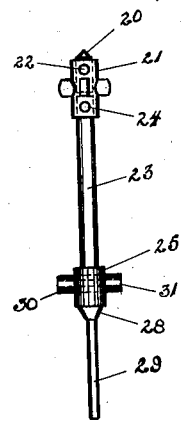
Fig. 3 is a detail of the valve and valve stem.

As shown in Fig. 3, a replaceable needle valve tip 20 is inserted in a spider-like collar member 21 and retained in position by a removable pin 22. The member 21 guides the valve 20 in the cage 12 and at the same time permits the liquid discharged to flow past the same and through the ported seat 13 when the valve is removed from its seat. A stem portion 23 is inserted in the lower portion of the member 21 and secured in position by a removable pin 24 in a manner similar to the valve tip 20. The stem 23 is preferably turned with an enlarged diameter at 25 having machined parallel sides 26. As shown in Figs. 1 and 3, a portion of the stem 23 is necked at 28 and then extended into a guiding tip 29.

Trunnions 30—31 are turned from the diameter 25 or otherwise provide transversely of the stem 23, and have levers 32—33 loosely pivoted thereon. A hole may be drilled through the trunnions and a cotter pin 34 employed to retain the levers in position. The levers 32—33 are preferably provided with fulcrum portions 35—36 adapted to contact with the face 37 of the bushing 10 in a manner to be hereinafter described. These levers extend outwardly through the openings 18'—19' in the brackets 18—19 and have downwardly extending locking tips 38—39. It is to be noted that the levers 32—33 are loosely positioned in the openings 18'—19'.

An opening 40 is provided in the center of the bottom of the inverted bucket 17 through which the guiding tip 29 extends; with the tip 29 fully inserted, the upper edge of the opening 40 constitutes a valve seat which is closed by the necked portion 28. The structure just described constitutes an air or gas vent auxiliary to the usual vent 41 which is well known in the art and employed to prevent the trap from becoming "air bound".

The operation of the above described mechanism is as follows: In the position shown in Fig. 1, sufficient water is present in the chamber surrounding the bucket 17 and sufficient steam has been admitted through the inlet 7 into the interior of the bucket 17 to float the same. In this position, the bucket is sealing the opening 40 and has carried the valve 20 and stem 23 upwardly to close the ported seat 13. In addition to the buoyancy of the bucket, the valve 20 is being held to a close seat by the line pressure. Upon the condensation of sufficient steam within the bucket, accelerated by slugs of water carried through the inlet, the bucket 17 will loose its buoyancy, in a manner well known in the art and will slowly sink, in the traps heretofore employed. However, in my improved trap, the moment the trap sinks the slightest amount, the necked portion 28 no longer seals the auxiliary vent 40 and thus permits any gas or air to be suddenly displaced by water to effect a rapid sinking of the bucket.

After the initial sinking of the bucket, the same, guided by the stem 29, contacts the levers 33—34 through the brackets 18—19, and in this manner the unbuoyed weight of the bucket is exerted at a point a considerable distance from the fulcrum point. As the levers 33—34 are carried downwardly with the bucket, the same fulcrum about the fulcrum portions 35—36 to exert a multiplied downward force upon the valve 20 through the trunnions 30—31 and stem 23. In view of the levers 32—33 being offset from the valve stem on opposite sides, the tendency toward inward movement on the part of the fulcrum portions 35—36, upon bucket sinkage, imparts a partial rotary movement in the valve 20 and stem 23, as a result of the free manner in which the same is slidably guided in the cage 12 and bushing 10. During the fulcrumage of the fulcrum portions 35—36, there is substantially no relative movement between the same and the face 37 of the bushing 10 thus reducing wear to a minimum. After cracking the valve 20 from its seat 13, the continued sinking of the bucket 17 may be defined as rotating the trunnions under their respective fulcrum portions 35—36, to increase the leverage applied to the stem 23. This is of decided importance, as contrary to expectation, it has been found that more force is required to remove the valve from the apex of the flow than to "crack" the same from its seat. When the valve 20 has been sufficiently removed from its seat, the continued downward movement of the bucket will bring the levers into locking relationship with the brackets 18—19, and the valve, stem, lever and bucket will move downwardly as a unit to position the valve 20 in full open position.

With the bucket in a lowered position and the valve 20 removed from its seat, the pressure in the line will force the water through the discharge ports 8—9, the ported seat 13 and out the discharge outlet 16, until such time as sufficient steam is admitted to again float the bucket. As the stem 23 has been partially rotated by the sinkage of the bucket, upon the floating of the same, the fulcrum portions 35—36 will contact with a different portion of the face 37 of the bushing 10. This action obviously results in distribution of wear upon the face 37.

The partial rotation of the valve each discharge of the trap is deemed one of the important features of my invention. It will be readily apparent to those skilled in the art, that I have eliminated scouring and cutting of the valve by wire drawing by providing a self seating valve. Another important feature resides in the closing of the valve at bucket speed independent of the leverage multiplication employed in the opening of the valve, thus practically eliminating wire drawing.

Although reference has been made throughout to the removal of water from steam lines, the application of my improved trap is not thus restricted, but may be satisfactorily employed to remove liquid from air and gas lines provided sufficient liquid is retained in the trap to float the bucket. Furthermore, I recognize the fact that several features of my improved valve actuating mechanism have application in any field in which the opening and closing of a valve is under the control of a float or the equivalent.

What I claim is:

1. In a trap, the combination with a float chamber having upper and lower discharge and inlet openings, of a valve cage having a ported valve seat communicating with said discharge opening, a bushing concentrically located relative to said cage having a lower face portion extending into said chamber, a valve member cooperating with said seat having a stem portion guided for axial movement in said cage and bushing, transverse trunnions located on opposite side of said stem intermediate the ends, an inverted open bucket float located in said chamber over said inlet, an opening located in the upper end of said bucket through which the lower end of said stem extends, slotted brackets located upon the upper end of said bucket on opposite sides of said last opening in offset relation, levers pivoted intermediate their ends upon said trunnions, said levers extending outwardly in opposite directions through said slotted brackets and in other opposite directions a lesser extent to provide fulcrum portions, said portions being adapted to contact with said face portion when said valve is in a closed position.

2. In a trap, the combination with a float chamber having upper and lower discharge and inlet openings, of a valve cage having a ported valve seat communicating with said discharge opening, a bushing concentrically located relative to said cage having a lower face portion extending into said chamber, a valve member cooperating with said seat having a stem portion guided for axial movement in said cage and bushing, transverse trunnions located on opposite sides of said stem intermediate the ends, an inverted open bucket float located in said chamber over said inlet, an opening located in the upper end of said bucket through which the lower end of said stem extends, slotted brackets located upon the upper end of said bucket on opposite sides of said last opening, levers pivoted intermediate their ends upon said trunnions, said levers extending outwardly in opposite directions through said slotted brackets and in other opposite directions a lesser extent to provide fulcrum portions, said portions being adapted to contact with said face portion when said valve is in a closed position.

3. In a trap, the combination with a float chamber having upper and lower discharge and inlet openings, of a valve cage having a ported valve seat communicating with said discharge opening, a valve member cooperating with said seat having a stem portion guided for axial movement in said cage, a float in said chamber, a slotted bracket located upon said float, a transverse trunnion carried by said stem, a lever pivoted upon said trunnion, said lever extending outwardly in one direction through said slotted bracket and in the other a lesser extent to provide a fulcrum portion, said portion being adapted to contact with a fixed portion of said chamber when said valve is in a closed position.

4. A trap or the like comprising a float chamber, a discharge valve mechanism having a rotatable stem, a seat for said valve, a fixed face portion, a member adapted to fulcrum upon said face pivotally secured to said valve, a float located in said chamber having a slidable loosely fitted connection with said member upon initial sinkage to effect relative movement between both said float and valve and to effect relative rotational movement between said valve and seat, and means to elevate said valve mechanism at float speed.

5. In a trap, the combination with a float chamber having discharge and inlet openings, a discharge valve having a stem, an inverted bucket float for actuating said valve, said bucket being coaxial with said valve and being loosely associated with said valve opened or closed, an auxiliary valve in the top of said bucket, including an opening defined by said bucket and receiving said stem, and a seat surrounding said stem comprising a part of said auxiliary valve for closing the same.

6. In a trap the combination with a float chamber, of a float located in said chamber, a discharge valve, a stem supporting said valve for axial and rotary movement, means guiding said stem for axial and rotary movement, a face on said guiding means projected into said chamber, a slotted bracket located on said float, a trunnion carried by said stem, a lever pivoted on said trunnion being materially spaced from the axis of rotation of said stem, one end of said lever extending outwardly in one direction through said slotted bracket, the other end of said lever extending to a lesser extent in the opposite direction and being provided with a fulcrum portion, said portion contacting said face when said valve is in a closed and nearly closed position, said lever being spaced sufficiently from the axis of rotation of said stem, whereby when said float rises, said fulcrum portion of said lever contacts with said face, and due to its tendency for movement relative to said face caused by said lever pivoting about said trunnion, and due to the engagement of said fulcrum portion with said face, said stem is rotated to distribute wear on the seating surface of said valve.

7. In a trap, the combination with a float chamber having discharge and inlet openings, a discharge valve mechanism guided for axial movement above said chamber and having an elongated stem extending through said chamber, a fixed face portion defining a part of the upper portion of said chamber adjacent said stem, a lever pivoted intermediate its ends to said stem, a float, a shoulder portion on said float with which the outer end of said lever engages to transfer the unbuoyed weight of said float to said stem through said lever, said lever and shoulder being spaced from each other with said float in a buoyed state, the other end of said lever constituting an abutment about which said lever is fulcrumed upon engagement between said lever and said shoulder whereby the unbuoyed weight of said float supported from said lever acts to actuate said valve, the momentum acquired by said float in sinking from a full buoyed position with said shoulder and lever in spaced relation to the position of engagement between said lever and shoulder assisting in the initial cracking of said valve from its seat.

8. In a trap, the combination with a float chamber having discharge and inlet openings, a discharge valve mechanism guided for vertical axial movement and having a stem extending into said chamber, a lever pivoted to said stem having a short end and a long end extending from its pivotal connection with said stem, said lever being supported to one side of the axis of said stem for movement in a vertical plane, a fixed face portion adjacent the axis of said stem with which a part of said short end of said lever engages and about which said lever fulcrums, the distance between the point of pivotal connection and the axis of said stem being substantially equal to the distance between the points of fulcrumage of said short end of said lever and the axis of said stem when compared with the lengths of the short and long ends of said lever, a float in said chamber acting upon said valve mechanism when in a buoyed state to hold said valve mechanism closed, a connection between said float and the long end of said lever for transferring the unbuoyed weight of said float to said stem to open said valve mechanism, said valve mechanism and float being supported for free rotary movement, the fulcrum of the short end of said lever upon said face tending to rotate said valve mechanism and float as a unit to distribute the wear of said valve mechanism upon its seat.

9. In a trap, the combination with a float chamber having discharge and inlet openings, a discharge valve and float mechanism associated as a unit for free vertical movement to open and close the discharge opening and for free rotary movement about a vertical axis, a pair of levers, said valve mechanism having a stem portion extending into said chamber, a pair of levers pivoted upon opposite sides thereof for movement in vertical planes, said levers being pivoted intermediate their ends to provide relatively short portions and relatively long portions extending in opposite directions from the pivotal connection of said levers on said stem, a fixed face portion contiguous with the axis of said stem and with which the short portion of said levers engage, interconnections between the long portions of said levers and said float for transferring the unbuoyed weight of said float to said stem upon the pivoting of said levers about the points of engagement of said short end with said face portion as a fulcrum, the distance from the axis of said stem to the pivotal connection with said levers and the point of engagement with said face portion being substantially equal when compared with the relative lengths of the short and long portions of said levers whereby the fulcruming of said levers about the points of engagement with said face portion tends to rotate said valve mechanism and float upon the transfer of the unbuoyed weight of said float to said stem through said levers.

10. In a trap, the combination with a float chamber having discharge and inlet openings, a discharge valve mechanism, a seat for said valve, a float, means actuated by said float to close said valve when said float is in its extreme elevated position, means supported on said valve mechanism, a lost motion connection between said means and said float whereby said valve mechanism upon initial sinking of said float is held to its seat until the float has acquired momentum, said float following initial sinking movement acting upon said means through said connection to crack said valve mechanism from its seat, said connection thereafter locking said valve mechanism and float together as a unit through said means whereby said valve mechanism is opened at float sinking speed.

11. In a trap, the combination of a float chamber having discharge and inlet openings, a discharge valve, a seat for said valve, means axially guiding said valve for movement toward and from said seat, a float, levers pivoted intermediate their ends upon opposite sides of the longitudinal axis of said valve, one end of each of said levers constituting a fulcrum engageable with a fixed part of said trap, the other end of each of said levers being adapted to receive the unbuoyed weight of said float, means constituting a lost motion connection between said float and said other end of each of said levers, said connection and said levers being disposed out of load supporting engagement with respect to one another with said float in its extreme elevated position with said valve engaging its seat, weight supporting engagement between said connection and said levers being established only after said initial sinking of said float a predetermined distance, the unbuoyed weight of said float exerted through said connection upon said levers causing said levers to fulcrum about said fixed surface to exert a multiplied force to crack said valve from its seat, the engagement between said levers and said connection being characterized by the fact that following initial sinkage said float is supported from said valve through said levers as a unit whereby said valve following cracking of the same from its seat is opened at float sinking speed.

12. In a trap, the combination with a float chamber having discharge and inlet openings, a discharge valve mechanism guided for axial and rotary movement, a float located in said chamber controlling the operation of said valve, a lever pivotally supported from said valve mechanism at a point offset from the axis of rotation of said valve mechanism, said lever being pivoted intermediate its ends to provide short and long portions, the end of said short portion removed from its pivotal point freely engaging a fixed part of the trap at a point adjacent the axis of rotation of said valve mechanism about which said lever fulcrums, a float, means connecting said float with the end of said long portion removed from its pivotal point whereby said lever is fulcrumed about the end of said short portion by the unbuoyed weight of said float to actuate said valve mechanism, the distance between the pivotal point of said lever upon said valve mechanism and the axis of rotation of said valve mechanism being substantially equal to the distance between the point of fulcrumage of said short portion and the axis of rotation of said valve mechanism when compared with the lengths of short and long portions of said lever, the transfer of the unbuoyed weight of the float upon said lever to fulcrum the same about the short end imparting a rotary movement to said valve mechanism and float.

HENRY E. SPADE.